(12) United States Patent
Bajic et al.

(10) Patent No.: US 12,399,713 B2
(45) Date of Patent: Aug. 26, 2025

(54) MULTIPLICATION HARDWARE BLOCK WITH ADAPTIVE FIDELITY CONTROL SYSTEM

(71) Applicant: Tenstorrent AI ULC, Toronto (CA)

(72) Inventors: Ljubisa Bajic, Toronto (CA); Milos Trajkovic, Toronto (CA); Syed Gilani, Markham (CA)

(73) Assignee: Tenstorrent AI ULC, Toronto (CA)

( * ) Notice: Subject to any disclaimer, the term of this patent is extended or adjusted under 35 U.S.C. 154(b) by 421 days.

(21) Appl. No.: 17/955,539

(22) Filed: Sep. 29, 2022

(65) Prior Publication Data

US 2024/0111525 A1     Apr. 4, 2024

(51) Int. Cl.
G06F 9/30         (2018.01)
G06F 7/48         (2006.01)

(52) U.S. Cl.
CPC .......... *G06F 9/3001* (2013.01); *G06F 7/4824* (2013.01)

(58) Field of Classification Search
CPC .............................. G06F 9/3001; G06F 7/4824
See application file for complete search history.

(56) References Cited

U.S. PATENT DOCUMENTS

| | | | |
|---|---|---|---|
| 5,557,563 A | 9/1996 | Larri | |
| 8,706,790 B1 | 4/2014 | Langhammer | |
| 9,146,706 B2 | 9/2015 | Dockser | |
| 10,318,317 B2 | 6/2019 | Bajic et al. | |
| 10,726,514 B2 | 7/2020 | Ould-Ahmed-Vall et al. | |
| 11,010,132 B2 | 5/2021 | Bajic et al. | |
| 2019/0005161 A1 | 1/2019 | Fleming et al. | |
| 2019/0042244 A1* | 2/2019 | Henry | G06F 9/30014 |
| 2020/0097799 A1 | 3/2020 | Divakar et al. | |
| 2021/0011686 A1 | 1/2021 | Makino et al. | |

OTHER PUBLICATIONS

Extended European Search Report dated Feb. 28, 2024 from European Application No. 23200901.9, 9 pages.
T. Tambe et al. (2019). AdaptivFloat: A Floating-point based Data Type for Resilient Deep Learning Inference. ArXiv, abs/1909.13271.
B. Liu, et al., E-ERA: An Energy-Efficient Reconfigurable Architecture for RNNs Using Dynamically Adaptive Approximate Computing, IEICE Electronics Express, Nanjing 210096, P.R.C., Jul. 14, 2017.

\* cited by examiner

*Primary Examiner* — Zachary K Huson
(74) *Attorney, Agent, or Firm* — Daylight Law, P.C.

(57) ABSTRACT

Methods and systems relating to computational hardware are disclosed herein. One disclosed method for executing a multiplication computation using a computational hardware block includes storing a first operand and a second operand for the multiplication computation. The first operand includes a first set of bit strings. The second operand includes a second set of bit strings. The method also includes multiplying the first set of bit strings and the second set of bit strings in a set of temporal phases using the computational hardware block. Each temporal phase uses a different group of bit strings from the first set of bit strings and the second set of bit strings. A cardinality of the set of temporal phases is determined by a fidelity control value. The fidelity control value adaptively sets a fidelity of execution of the multiplication computation.

25 Claims, 7 Drawing Sheets

MULTIPLICATION HARDWARE BLOCK WITH ADAPTIVE FIDELITY CONTROL SYSTEM

BACKGROUND

If you fold a piece of paper in half a mere fifty times, the resulting stack of paper would be as thick as the distance from the Earth to the Sun. While each fold is a simple operation that increases the thickness of the stack by two, the aggregate task is not at all simple. Likewise, many computations conducted by modern computing systems are composite computations that are composed of multiple simple component parts. Each component calculation may be trivial to execute, but the number of components may be astronomically large, resulting in a composite computation that is anything but trivial. Indeed, basic computations that have been handled with ease since the dawn of computing can, taken in the aggregate, result in a composite computation that is effectively intractable for a given application.

Demand for computational resources is increasing at an exponential rate in our society. It is estimated that by the end of the current decade, a majority of the global population will require a computation to be executed by a data center at a continuing frequency in excess of once every 15 seconds. As such, approaches used to increase the efficiency of these computations are desirable from both a user convenience perspective and from an environmental impact standpoint. While the energy consumption of data centers is not directly apparent to the average user surfing the internet, the energy consumption required for all these myriad computations is far from negligible. The International Energy Agency estimates that approximately 1% of current global energy demand is attributable to data centers already. Due to the exponential increase in the demand for computational resources, and an accompanying low probability for global energy supply to exponentially increase, technology that is used to improve the efficiency of computations has been and will continue to be of paramount importance.

SUMMARY

Methods and systems related to the field of computational circuits are disclosed. The methods and systems disclosed herein include methods and computational circuits for executing multiplication computations with adaptive fidelity. The multiplication computations can be conducted in a set of temporal phases with the fidelity of the computation increasing with each temporal phase. In specific embodiments, the output of each temporal phase is used in the next temporal phase. The fidelity can be adaptive in that the number of temporal phases executed can vary from one computation to the next such that more resources are spent on certain computations as compared to others. The fidelity can be determined by a fidelity control value which can be set ex ante to the execution of the computation, and can, in the alternative or in combination, be adaptively set through the course of execution of the computation. The fidelity control value can be set based on an evaluation of the operands, a set of data structures of which the operands are a part, metadata associated with the operands, a product of a prior temporal phase, and various other factors.

In specific embodiments of the inventions disclosed herein, a method for executing a multiplication computation using a computational hardware block is provided. The method comprises storing a first operand and a second operand for the multiplication computation. The first operand and includes a first set of bit strings. The second operand includes a second set of bit strings. The method also comprises multiplying the first set of bit strings and the second set of bit strings in a set of temporal phases using the computational hardware block. Each temporal phase uses a different group of bit strings from the first set of bit strings and the second set of bit strings. A cardinality of the set of temporal phases is determined by a fidelity control value. The fidelity control value sets a fidelity of execution of the multiplication computation.

In specific embodiments of the inventions disclosed herein, a computational hardware block for executing a multiplication computation is provided. The computational hardware block comprises at least one computer-readable medium storing a first operand and a second operand for the multiplication computation. The first operand includes a first set of bit strings. The second operand includes a second set of bit strings. The computational hardware block also comprises at least one multiplier unit multiplying the first set of bit strings and the second set of bit strings in a set of temporal phases using the computational hardware block. Each temporal phase can use a different group of bit strings from the first set of bit strings and the second set of bit strings. A cardinality of the set of temporal phases is determined by a fidelity control value. The computational hardware block also comprises a control register storing the fidelity control value.

In specific embodiments of the inventions disclosed herein, a computational hardware block for executing a multiplication computation is provided. The computational hardware block comprises a means for storing a first operand and a second operand for the multiplication computation. The first operand includes a first set of bit strings. The second operand includes a second set of bit strings. The computational hardware block also comprises a means for multiplying the first set of bit strings and the second set of bit strings in a set of temporal phases using the computational hardware block. Each temporal phase uses a different group of bit strings from the first set of bit strings and the second set of bit strings. A cardinality of the set of temporal phases is determined by a fidelity control value. The fidelity control value sets a fidelity of execution of the multiplication computation.

DETAILED DESCRIPTION

Methods and systems related to the field of computational circuits in accordance with the summary above are disclosed in detail herein. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Figure 1:
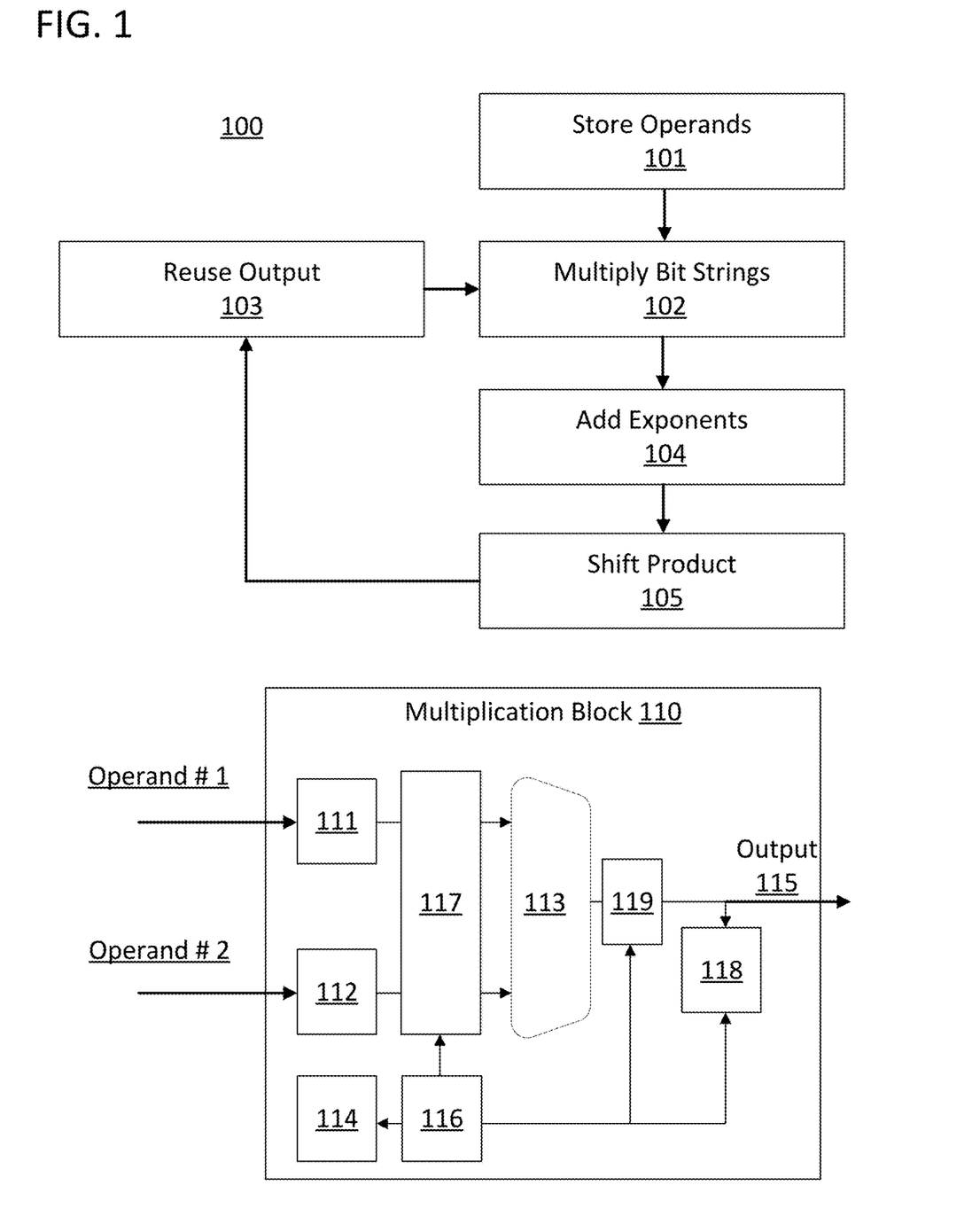
FIG. 1 illustrates a flow chart for a set of methods for executing a multiplication computation using computational hardware blocks and an associated multiplication block that are in accordance with specific embodiments of the inventions disclosed herein.

FIG. 1 illustrates a flow chart 100 for a set of methods for executing a multiplication computation using a computational hardware block. The multiplication computations of flow chart 100 can be executed by any computational hardware block. For example, the computations can be executed by a multiply and accumulate hardware block. However, in the example of FIG. 1, the accompanying computational block is a multiplication block 110. Flow chart 100 represents a set of methods. The individual steps of flow chart 100 are optional in that they are not executed in all the methods in the set of methods represented by the flow chart. The execution of the multiplication computation can be executed in multiple temporal phases involving loops through the illustrated steps in various paths through the flow chart. The number of temporal phases impacts the fidelity of the multiplication computation in that an increasing number of temporal phases results in an increase in the fidelity of the computation. The relationship between increasing fidelity and number of temporal phases can be monotonic. The relationship between increasing fidelity and number of temporal phases can be linear. In specific embodiments, a product output resulting from a temporal phase can be an approximation of a mathematically accurate product of the two operands, and a product output from each subsequent temporal phase can move the approximation closer to the mathematically accurate product. The number of temporal phases could be adaptively adjusted either ex ante to the commencement of the first temporal phase or during the execution of the computation. In this way, for each computation executed by the computational hardware block, the fidelity and resource consumption of the computation can be adaptively traded with more temporal phases being used for computations that should be computed with more accuracy.

The steps of flow chart 100 can be implemented in various ways. The steps of flow chart 100 can be implemented by the execution of instructions stored in one or more non-transitory computer-readable media. The instructions can be executable by a processor and stored in memory. The instructions can be executed by a processing core, microprocessor, application-specific integrated circuit, programmable gate array, or hard coded logic. The instructions can be hard coded into logic on an integrated circuit such that they are stored by being instantiated in hardware and are executable in response to the application of input signals and optional control signals, such as one or more clock signals, to the logic. The instructions can be executable by a hardware block such as multiplication block 110. The instructions can be stored in a main memory of a processor and executed by a controller of the processor or a processing pipeline of the processor. The instructions can include kernels of a processing core. The instructions can be microcode instructions in a programmable controller. In the context of the method being executed by a computational block, the instructions can be executed by a combination of hard coded logic and a block controller such as block controller 116 described below. If the computational block is part of a processing pipeline, the instructions can be executed by the controller, such as a core controller, responsible for administrating the pipeline.

The computational blocks disclosed herein can be implemented in various ways. For example, a computational block such as multiplication block 110 can be implemented in various ways. Multiplication block 110 could be a computational unit in the computational pipeline of a processing core or a standalone computational resource in a logic circuit. Multiplication block 110 could be implemented using various electronic components such as wires, transistors, and passive components. Multiplication block 110 could also include more complex components such as Boolean logic gates, flip-flops, registers, programmable controllers, and various other components. Multiplication block 110 could be defined by a region of an integrated circuit in which the functionalities of the multiplication block 110 described herein are physically executed.

Flow chart 100 includes a step 101 of storing a first operand and a second operand for a multiplication computation. The operands can be the operands of a multiplication computation that is to be executed by a computational block such as multiplication block 110. The operands can be provided to the multiplication block from an external source and stored in registers until one or more multiplication units of the multiplication block are available to execute the multiplication computation. While the example of a multiplication block receiving two operands is provided as an example, it is to be appreciated that a computational block can receive more than two operands. For example, a multiplication block can receive more than two operands to be used in a multiplication operation such as one in which all operands delivered to the multiplication block are multiplied together to compute a single output, or in which multiple sets of operands are delivered to the multiplication block to allow the multiplication block to simultaneously conduct a plurality of independent multiplications.

The operands provided to the computational block in specific embodiments of the inventions disclosed herein can take on various forms. The operands can be numbers which are stored as data elements of various kinds. For example, the operands could be stored as integer numbers, floating-point numbers, or any other kind of data structure or encoding. As another example, the operands could be represented by 2, 4, 8, 16, 32, or any number of bits. The operands can be parts of larger data structures. For example, the operands could be entries from two different matrices which are being used in a matrix multiplication operation. As another example, the operands can be weight values in a layer of an artificial neural network (ANN), filter values in a filter of an ANN, accumulation values generated through the execution of an ANN, and other values associated with later data structures. The operands can be represented by sets of bit strings. For example, the first operand can be an operand such as operand 201 in FIG. 2. The second operand can be an operand such as operand 202 in FIG. 2. The operands can include sets of bit strings. For example, operand 201 includes a first set of bit strings 203 which includes a first bit string 205 and a second bit string 204, and operand 202 includes a second set of bit strings 206 which includes a first bit string 207 and a second bit string 208. In the example, the illustrated operand 201 and operand 202 are integer operands and the first bit string of each operands represents the most significant bits of the operand and the second bit string of each representing the least significant bits of the operand. However, in alternative examples, the operands could be floating point numbers and one or more of the bit strings of each operand could include a mantissa of the operand while another one or more of the bit strings could include an exponent of the operand. The operands could also include any number of bit strings in their set of bit strings and the bits per string could be as small as 1 bit or as large as can be accommodated by the multiplication units of the computational block to which they will be applied.

The operands can be stored in various ways in different embodiments of the inventions disclosed herein. The operands can be stored in a means for storing an operand for a multiplication such as the structures disclosed in this paragraph. The operands can be stored in at least one non-transitory computer-readable medium. The operands could be stored in one or more non-transitory computer-readable media such as a dynamic random-access memory, a static random-access memory, a register, a flip-flop, a latch, or any other computer-readable memory. The operands can be stored in a memory in the multiplication block. For example, the operands could be stored in registers that receive operands from inputs to the multiplication block 110 such as register 111 and register 112. The operands could also be stored in registers that are external to the multiplication block which are controlled by the controller of a computational pipeline. The computational block could receive control signals to determine how long the operands are stored in the memory. In specific embodiments, these control signals could depend on a number of temporal phases used to execute the computation. For example, the control signals could be impacted by the fidelity control value of the computational block and keep the operands available in the registers until all temporal phases of the computation were complete. If the computation were finished in a single temporal phase, the registers could cease to store the values after the values were obtained. If additional temporal phase were required, the registers could be instructed to continue to store the operands.

In specific embodiments, the operands can be larger than a data path of a computational block which will be used to multiply them. In specific embodiments of the invention, a computational block can be part of a computation pipeline defined by a data path with a given width and the computational block can accept operands that have that width while the multiplier unit, or set of multiplier units, of the computational block has a smaller data width than the data path. For example, the incoming operands to register 111 and register 112 could be 8-bit operands while multiplier unit 113 may be designed to only accept 4-bit operands. While a single multiplier unit 113 is shown, a multiplication block can have far more than one multiplier unit. In the illustrated case, if multiplier unit 113 could only accept 4-bit operands, and the operands were each 8-bits, it would not be physically possible for multiplication block 110 to execute a full fidelity multiplication computation using the input operands in a single temporal phase. However, in specific applications, a lower fidelity execution of a multiplication may provide sufficient accuracy, and only a subset of the computations in a multiplication needs to be executed with full fidelity. Accordingly, using such a multiplication block, it is possible to provide significant resource savings with a minimal impact on accuracy. In these embodiments, the multiplication block 110 can be reduced in size relative to a conventional multiplier that would otherwise be used in its place. Generally, the variable cost associated with manufacturing a semiconductor component increases with the size of the component. As such, the resulting system, of which computation blocks in accordance with this paragraph are a part, can be more compact and therefore less expensive.

Flow chart 100 further includes a step 102 of multiplying bit strings. The step can include multiplying two or more bit strings. The step can be conducted using one or more multiplier units that each take in two or more bit strings, multiply the bit strings, and generate a product output. For example, multiplier unit 113 can receive a bit string from register 111, a bit string from register 112, and output a product of those bit strings on output 115. The step of multiplying the bit strings can be conducted iteratively in a set of temporal phases to multiply a first set of bit strings and a second set of bit strings in the set of temporal phases using a multiplier unit. For example, different bit strings from the first set of bit strings that are stored in register 111 and different bit strings from the second set of bit strings that are stored in register 112 could be delivered to the multiplier unit 113 in sequence or in pipelined fashion. Each temporal phase in the set of temporal phases could use a different group of bit strings from the first set of bit strings and the second set of bit strings. A cardinality of the set of temporal phases could be determined by a fidelity control value. For example, a control register 114 could store a fidelity control value which determines the number of temporal phases to be executed by the multiplication block 110 for a given computation using different groups of bit strings from register 111 and 112. As the accuracy of the multiplication product on output 115 will increase with each temporal phase, the fidelity control value would also thereby set a fidelity of execution of the multiplication.

Different groups of bit strings can be selected from the operands to be multiplied in multiple temporal phases in different ways depending upon the size and number of the operands, as well as the data type of the operands. The order in which bit strings are taken from each operand and combined in each phase and the number of bits in each bit string can be referred to as a pattern. For example, fidelity control register 114 could be read by a block controller 116 which is responsible for passing the appropriate values from register 111 and 112 to multiplier unit 113 through a selector 117. The selector 117 could be a configurable cross bar, bus, multiplexer, or any other circuitry which passes a subset of values from its inputs to one or more outputs. The order in which the different bit strings are selected from the operands could be hard coded into block controller 116 or could be programmed into kernels stored in a memory accessible to block controller 116 to be executed by block controller 116 to draw the bit strings in different patterns according to the instructions of the kernels. Using approaches in which the patterns are defined in kernels stored in memory accessible to the block controller, or that are otherwise defined by a higher-level controller, the same hardware block can be used with different patterns at different times which gives additional adaptability to the system's control over the tradeoff between fidelity and resource consumption.

In specific embodiments of the invention, different sets of bit strings can be selected in different ways through the course of the temporal phases. In specific embodiments, the patterns will be defined so that each bit string of one operand is multiplied by each bit string of the other operand one time when the maximum number of temporal phases are applied. For example, if the operands were 8-bit numbers, and the maximum number of temporal phases was four, the size of the bit strings would be set to four bits if a full fidelity computation was expected to be executed in four phases. In specific embodiments of the invention, the number of bits in each string can be variable from one temporal phase to another. In other embodiments of the invention, the number of bits in each string can be fixed in each temporal phase. In specific embodiments of the invention, the groups of bit strings selected for the first temporal phase will be the bit strings that will have the biggest impact on the fidelity of the computation. For example, if the operands were integers, the bit strings selected to be multiplied in the first temporal phase could be selected from the most significant bits of both operands. As another example, if the operands were floating point numbers, the bit strings could be the most significant bits of the mantissas of the floating-point numbers. The number of bits in each bit string can be set based on the maximum number of temporal phases allowable and the data path width of the multiplier units of the multiplication block. The size of the bit strings can be set to the data width of the multiplier units, and the number of phases can be selected based on this number and the overall size of the operands.

Figure 2:
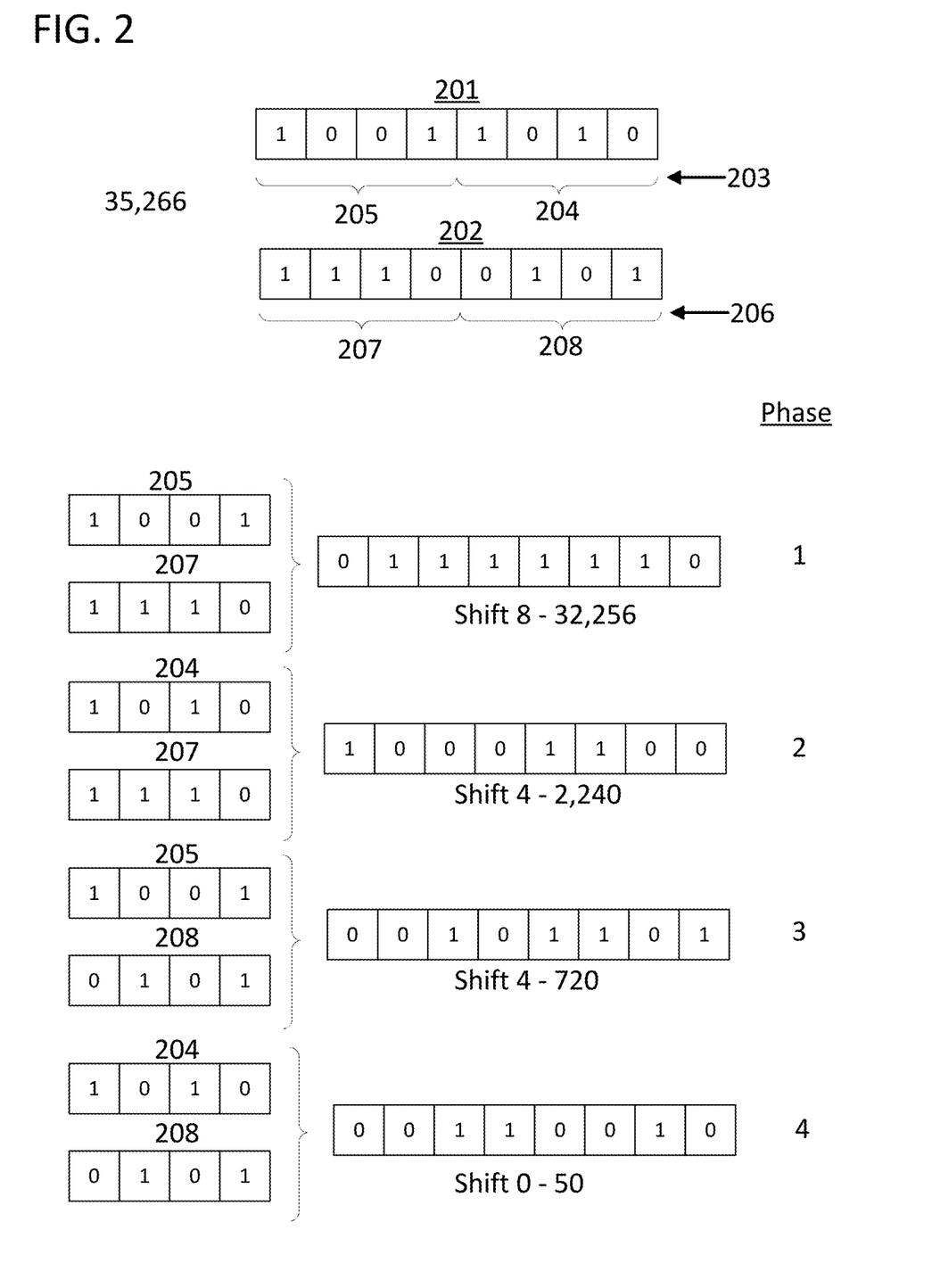
FIG. 2 illustrates a block diagram of a set of operands, each of which are composed of a set of bit strings, being multiplied in multiple temporal phases in accordance with specific embodiments of the inventions disclosed herein.

In specific embodiments of the invention, the bit strings can be selected in different patterns for the various fidelity phases according to the commands of the block controller. For example, in a first temporal phase, a first set of bit strings from a first operand could include a set of most significant bits of the first operand (e.g., the bit string 205, which may be a set of most significant bits of first operand 201) to be multiplied with a second set of bit strings which includes a set of most significant bits of a second operand (e.g., the bit string 207, which may be a set of most significant bits of second operand 202). A first temporal phase in the set of temporal phases would thereby multiply a set of most significant bits of the first operand and a set of most significant bits of the second operand. In the example of FIG. 2, the pattern is to first select the most significant bits of both operands, then select different combinations of the most significant bits with the less significant bits of the other operand, and then select the least significant bits of both operands in a final phase. The patterns can be fixed and applied to any set of operands equally by being hard coded with respect to addresses of the registers holding the operands. Alternatively, the patterns can be adjusted based on metadata associated with the operands that is provided to the block controller when the operands are loaded into the registers. For example, if it is known ex ante that a given operand is critical to the outcome of a computation, the most significant bits of that operand can be favored with respect to the other when selecting bit strings for the pattern used to multiply those two operands.

The administration of the movement of bit strings from storage to the computational hardware block can be accomplished using various structures in different embodiments of the invention. For example, multiplying a first set of bit strings and a second set of bit strings in a set of temporal phases using a computational hardware block can be achieved using the computational hardware block and a means for multiplying a first set of bit strings and a second set of bit strings in a set of temporal phases. These particular means can be referred to as means for multiplying for ease of reference and can be implemented as described in this paragraph. The means for multiplying can include a fidelity control register storing a fidelity control value, a block controller, and a selector. The fidelity control register could have the characteristics of fidelity control register 114. The fidelity control register could be a read/write memory storing a bit code for the fidelity control value. The fidelity control value could express a range of values from 1 up to the highest possible cardinality of the set of temporal phases for the computational block. The highest possible cardinality could be equal to the number of temporal phase necessary for the product output of the multiplier block to equal the mathematically correct product of the multiplication computation. The block controller could have the characteristics of block controller 116 described herein. The block controller could be configured to read the value in the fidelity control register, and in some embodiments, optionally recheck the value after each temporal phase. The selector could be a multiplexer, controllable cross bar, or bus connecting two or more registers storing the operand values, to the inputs of one or more multiplier units. The selector could have a control input connected to the block controller. The control input could be connected to a block controller such as block controller 116 and determine which inputs were passed through the selector to the multiplier unit. The selector could have the characteristics of selector 117.

The output of each temporal phase could be an approximation of the mathematically correct output of the multiplication of the two operands from which the bit strings are selected. In specific embodiments of the invention, the product outputs of the groups of bit strings can be shifted in order to create an approximation of the mathematically correct output. The shifting can be done in accordance with step 105 of flow chart 100. The shifting of bits can be controlled by a shift circuit 119 (which may be referred to as a shifter circuit or a shifting circuit) connected to an output of the multiplier unit 113. Alternatively, the shift circuit 119 can be part of the means for multiplication. The amount by which the bit strings are shifted can change for each temporal phase to adjust for which bits were selected in that temporal phase. The amount by which the bit strings are shifted can be controlled by a numerical control signal output of the block controller. Alternatively, the amount by which the bit strings are shifted can be hard coded into the logic of the shifting circuit such that the same control signal sent to selector 117 will instruct shift circuit 119 how much to shift the output by for a given temporal phase. In general, the bits can be shifted by the sum of the number of bits from the selected bit strings to the least significant bit of the operand from which the bit strings are selected.

FIG. 2 provides an example of how bits can be selected and shifted for integer operands. In the example of FIG. 2, the operand 201 is 154 and operand 202 is 229. Operand 201 comprises a set of bit strings 203 which includes first bit string 205 and second bit string 204. Operand 202 comprises a second set of bit strings 206 which includes first bit string 207 and second bit string 208. As illustrated, in the first temporal phase, bit string 205 and bit string 207 are selected and multiplied. The result is then shifted by eight by introducing eight zeros to the right of the product. The value eight is selected because the sum of the number of bits from the two selected bit strings to the least significant bit of the operand from which the bit strings are selected in this case is 8. The result of the multiplication of first bit string 205 and second bit string 207 is 32,256 which is the first low fidelity estimate of the correct mathematical output 35,266. In the remaining phases, based on which bit strings are selected, the multiplier block shifts by 4 zeroes or not at all using the process described above.

In specific embodiments of the inventions disclosed herein, the output of each temporal phase can be reused in the next phase to increase the accuracy of the output. As such, flow chart 100 incudes a step 103 of reusing an output from a prior iteration to update the output. As illustrated, in FIG. 2 the output of the second temporal phase, when shifted to include four zeros to the right of the presented eight bits, produces a product output of 2,240. In a similar manner, the output of the third temporal phase is 720 as illustrated. After each phase, the product output from the prior temporal phase can be reused by, in this example, being added to the current product output. Accordingly, when all four illustrated fidelity phases are completed, and the four values from each temporal phase are summed, the output is equivalent to the mathematically correct product 35,266. As illustrated, in each phase, the work generated by the prior phases was reused by being accumulated with the latest product.

The step of reusing the output of prior temporal phases could be conducted by a means for reusing a product output of the computational hardware block, from a temporal phase in the set of temporal phases, in a next temporal phase of the set of temporal phases. For example, the step could be conducted by an accumulation circuit such as accumulation circuit 118 coupled to the output of the multiplier unit 113. The accumulation circuit could be designed to receive a new value and add it to a stored running total using an adder and a memory such as a register bank. The accumulation circuit could also include a control input for clearing the total. The control input could be connected to a controller of the multiplication block such as controller 116. The final output values could be read from the same memory used to accumulate the total.

FIG. 1 also includes a step 104 of adding the exponents of the operands. This step is optional as it generally applies to operands stored as floating point data structures and the operands may be integer data structures without exponents. This step could be applied to situations when a first operand is stored as a first floating point data structure, such as operand 301 stored as floating point data structure 303 and having a first exponent bit string 305, and a second operand is stored as a second floating point data structure, such as operand 302 stored as floating point data structure 304 having a second exponent bit string 306. The data structures in FIG. 3 otherwise have the same values as in FIG. 2. In the illustrated case, the exponents could be added which in this case would produce a value of 3. Step 104 could be conducted by a means for adding the exponents of the operands. The means could be an adder circuit. In specific embodiments, the means could include the selector 117 and the block controller 116 (which may be referred to as a program controller) augmented to select the exponent bit strings from the operands in registers 111 and 112 during a first temporal phase and an adder circuit, not shown, to which the values could be delivered for addition.

Figure 3:
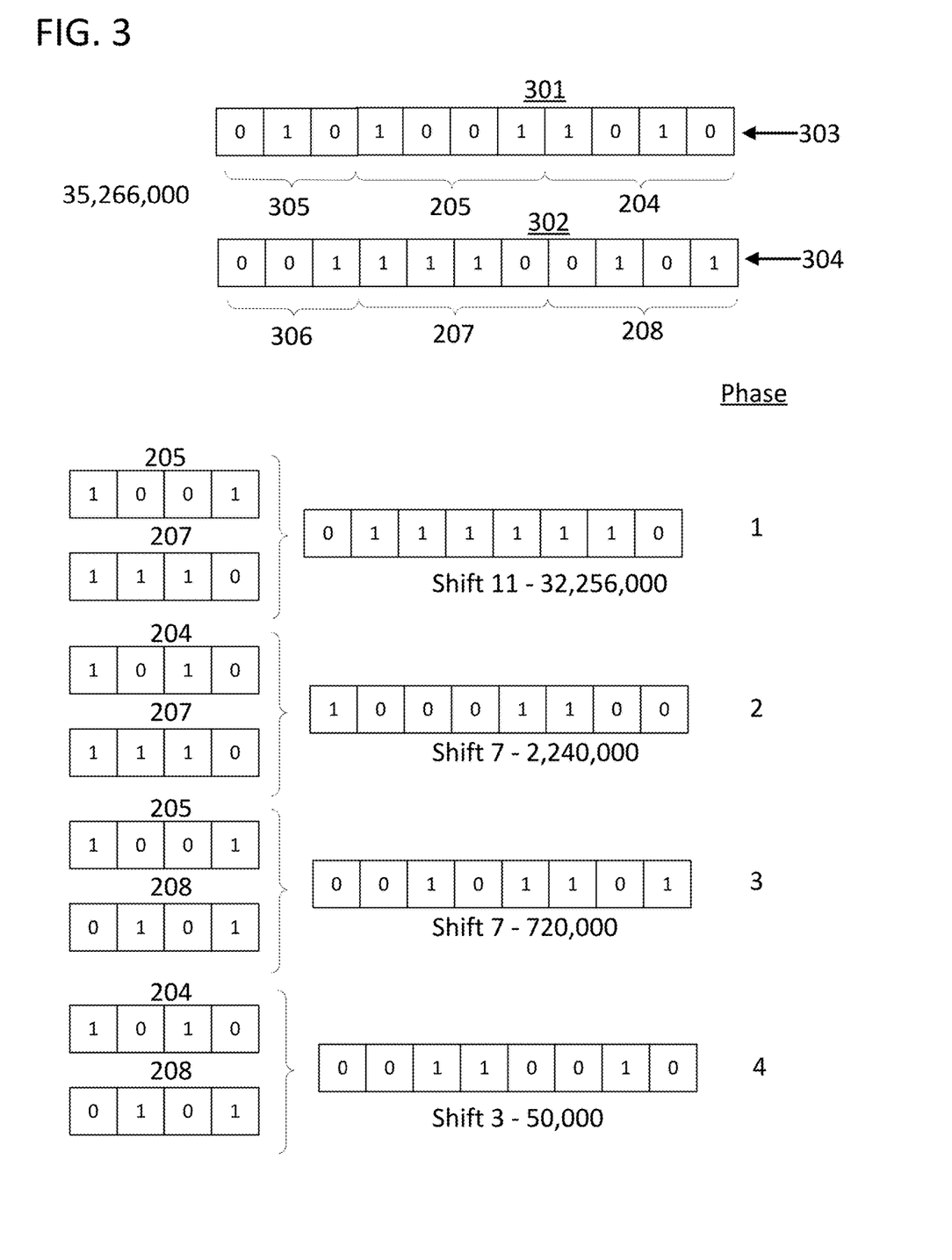
FIG. 3 illustrates a block diagram of a set of floating-point operands, each of which are composed of a set of bit strings, being multiplied in multiple temporal phases in accordance with specific embodiments of the inventions disclosed herein.

Adding the exponents of two operands, such as in the execution of step 104, could be conducted concurrently with or prior to the first temporal phase of the multiplication computation to generate a shift reference value for the system. The shift reference value could then be used in each phase in the set of temporal phases. In the example of FIG. 3, the shift reference value could be 3 as described in the prior paragraph. After the step of summing the exponents has been conducted, the exponent value could be used to shift the product of step 102 in a step 105. In specific embodiments of the inventions disclosed herein, this step of shifting the product could be combined with the step of shifting the product based on which bit strings were selected from the operand. Both types of shifting could be conducted by the same shift circuitry or could be conducted by separate circuits. For example, the shift circuit 119 could receive both the shift reference value from the adder circuit and a signal indicating the appropriate shift for a given set of bit strings and shift the output according to both values. An example of how the shift reference value is used in multiple temporal phases can be described with reference to FIG. 3 in which the same bit string patterns used in FIG. 2 are selected, but the shift values of each phase are incremented by the shift reference value of 3.

In specific embodiments of the invention, the reuse of each temporal phase in the next phase can involve shifting the product output of the subsequent temporal phase in different amounts and different directions and can involve rounding of the product outputs. In the example of FIG. 2, the output of each phase was shifted by a fixed amount depending upon the position in the operand from which the bit strings were obtained. However, in alternative approaches, the degree by which the outputs are shifted can depend upon the product output itself. For example, the output 0011 from a multiplication of the most signifigane bits (MSBs) of two eight-bit numbers could only be shifted by six instead of eight. As another example, the output 1001 from the multiplication of the LSBs of two floating point numbers could be shifted by three such that only the value "1" remained and the exponent of the product output could be adjusted accordingly. In embodiments using floating point numbers, the product outputs could be shifted to the left or the right based on how much rounding was acceptable, the position of the bit strings in the operands, and the product output of a particular temporal phase so long as the accumulation circuit, and potentially separate registers for retaining shift values, kept track of how many bits each product output was shifted by with respect to the absolute exponent for the accumulated total, and the absolute exponent for the accumulated total itself.

As described above, the number of temporal phases, and thus the fidelity of the computations, can be determined with reference to a fidelity control value set in a fidelity control register. The manner in which this value can be determined, and the manner in which the fidelity control value can be set are described in the following paragraphs. In general, the fidelity control value can be set based on an evaluation of the operands, a set of data structures of which the operands are a part, metadata associated with the operands, a product of prior temporal phases, and various other factors. The evaluation can include a mathematical evaluation to determine a histogram, standard deviation, variance, mean, median, or other statistical value for the evaluated data. The evaluation can also include mathematical operations conducted on these values such as a summation or median calculation of the metadata values associated with a set of operands. The evaluation can also include simply taking the value and loading it into the fidelity control register. For example, metadata associated with an operand could itself be a fidelity control value which is to be loaded into the fidelity control register of a computational block when the operand is loaded into an operand register of the computational block.

The cardinality of the set of temporal phases can be set in various ways in different embodiments of the inventions disclosed herein. The cardinality can be fixed ex ante to the execution of the first temporal phase. Alternatively, or in combination, the cardinality can be modified through the execution of the set of temporal phases. In any of these cases the cardinality can be adaptively determined for a given computation with respect to other computations executed by the same hardware at a different time. Accordingly, the system can adaptively determine an amount of computational resources to apply to a given computation relative to others. The cardinality can be determined by accessing a control register of a computational hardware block during the set of temporal phases.

Figure 4:
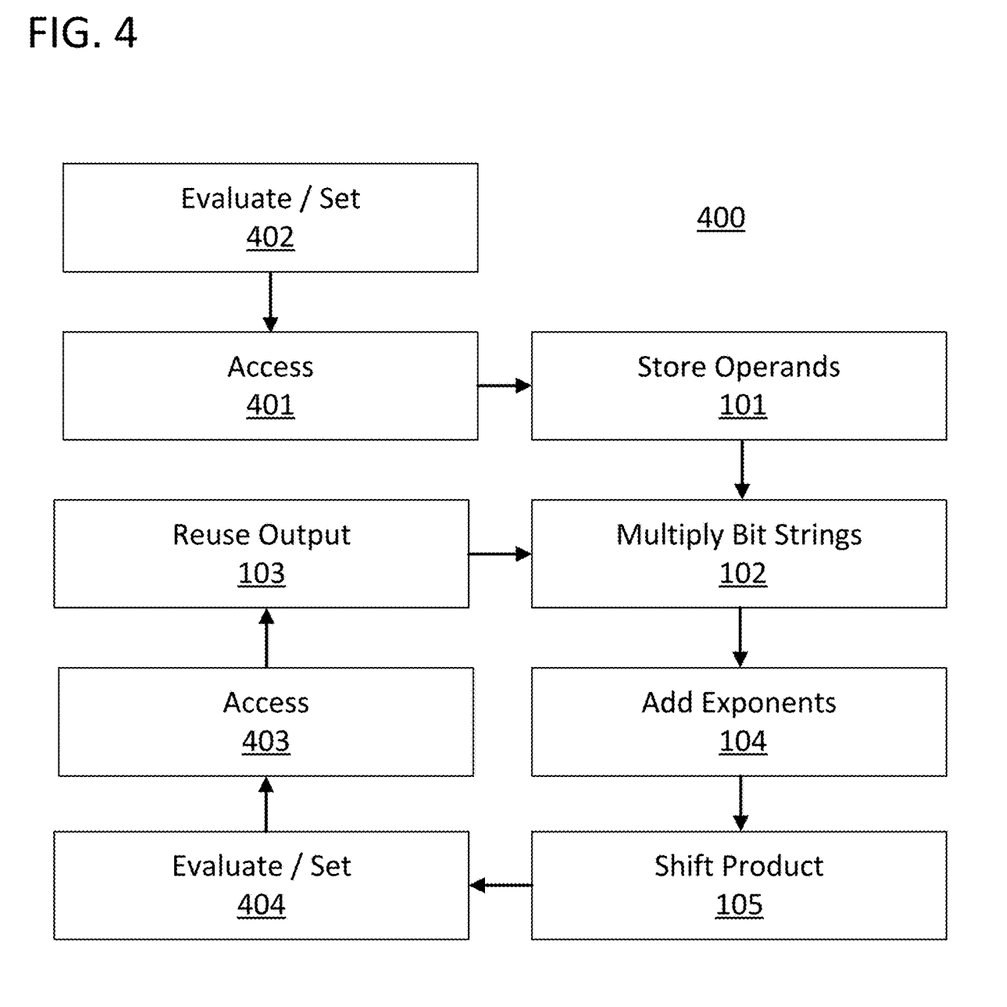
FIG. 4 illustrates a flow chart for a set of methods for executing a multiplication computation using computational hardware blocks and the setting of a fidelity control value in accordance with specific embodiments of the inventions disclosed herein.

FIG. 4 provides a flow chart 400 for a set of methods for conducting a multiplication computation in accordance with specific embodiments of the inventions disclosed herein. Flow chart 400 includes many of the steps of flow chart 100 which can be executed as described above. Additionally, flow chart 400 includes a step 401 of accessing a control register to determine a cardinality of the set of temporal phases before the first execution of a temporal phase. The step can involve accessing a control register such as control register 114 in FIG. 1. The fidelity control value can be set in a control register before a first temporal phase in the set of temporal phases. For example, a value can be written to control register 114 before any of the bit strings are provided from register 111 or register 112 to multiplier unit 113. The cardinality can be changed by modifying the value in the control register during the set of temporal phases. Accordingly, flow chart 400 includes a step 403 of accessing the control register to determine the cardinality of the set of temporal phases during an execution of the temporal phases. In specific embodiments, step 401 is not practiced, and step 403 is practiced as the system assumes at least one temporal phase will be executed, and the value is set either in parallel with the first computation or after an evaluation of an output of the first computation.

The cardinality of the set of temporal phases can be set based on an evaluation that takes place at different times with respect to the execution of the temporal phases in different embodiments of the inventions disclosed herein. The cardinality can be set based on an evaluation of the operands prior to the execution of the set of temporal phases as in a step 402. The cardinality can be set based on an evaluation of the output of a temporal phase during the execution of the set of temporal phases as in a step 404. Combinations of these two approaches are possible including those in which a first evaluation is used to generate a value to set which is then revised during the execution of the temporal phases. Alternatively, step 402 can be removed as the system may assume that at least one temporal phase will be conducted and the evaluation required for step 404 can be conducted in parallel with or after the execution of the first temporal phase. The evaluation in step 404 can be an evaluation of the operands or an output of the temporal phase.

The cardinality can be set based on an evaluation of the operands. The step can include evaluating a data structure within which the operands are selected, evaluating a single operand, or evaluating a set of operands that will be utilized in the computation. In these evaluations, the system can be designed to select a level of fidelity that is expected to be required based on the operands. For example, if it were determined that the operands to a multiplication were 4-bit numbers a fidelity phase of one could be selected, while if it were determined that the operands to a multiplication were 8-bit numbers a fidelity phase of four could be selected. As another example, if it were determined that the operands (e.g., the first and second operands to be used in a computation), or a data structure from which the operands were taken, included a high degree of clustering around the value zero without large deviations, the system could increase the fidelity of the computations by increasing the cardinality of the set of temporal phases. The first operand and the second operand could be in a set of data structures, and the evaluation could determine a degree of distribution around zero of the set of data structures. The system could then set the fidelity based on that evaluation. The system could use a relationship between the cardinality and a standard deviation of the values around zero in order to set the cardinality based on this measurement. While the example of four phases has been used throughout this disclosure, the number of potential phases could be much higher providing the opportunity for complex relationships between these values. As another example, in the alternative or in combination, if it were determined that a floating point operand had an exponent value that varied greatly compared to the exponent values of other operands to be used in the same computation, the fidelity could be increased for computations using that value as it would be expected to have an outsized impact on the overall computation using the values from the data structure. The step could involve evaluating a first operand and a second operand using an evaluation where the first and second operands are floating point data structures and the evaluation determines a degree of distribution of a set of exponents of the set of floating point data structures.

The cardinality can alternatively or in combination be set based on an evaluation of the product outputs of each temporal phase. Such an evaluation and setting could be conducted in accordance with step 404 in flow chart 400. Step 404 could include evaluating a product output of the computational hardware block from a temporal phase in the set of temporal phases using an evaluation and setting the fidelity control value based on the evaluation. For example, the evaluation could evaluate an exponent of the output. If the output is to be summed with other values, such as in FIG. 5, and the output has a much lower exponent than the current running total or the most recent values to be added to the total, than the fidelity could be kept low (i.e., another temporal phase could be cancelled or the number of temporal phases could be significantly reduced).

In specific embodiments of the invention, the analysis of the operands or outputs could include evaluating metadata of the operands or outputs. For example, data held in a header of an operand or otherwise stored in association with the operand and indicating how important the operand was to a given computation could be evaluated. As another example, data held in a header of an operand could identify a data type of the operand (e.g., 8-bit integer) and this metadata could be used to control the fidelity of a computation using that operand. The fidelity level could be adjusted based on the metadata to increase the fidelity for operands or outputs labeled with high importance and to decrease the fidelity for operands or outputs labeled with lower importance. As another example, similar data could be stored in association with the operands and provided to the computational circuit along with, based on, or in response to, the delivery of the operands to the circuit. In either process the methods of executing a computation described above could be expanded to include storing a fidelity control value in association with a first operand according to an association and setting the fidelity control value in the control register of the computational hardware block when loading the first operand into the computational hardware block. The association could be the relationship of an operand to its header in the first example or a key-pair storage relationship between the fidelity control value and the operand.

The setting of the fidelity control value and any of the evaluating steps mentioned above could be conducted by a means for evaluating and a means for setting. The means for setting could be logic configured to take a product of the evaluation or a fixed value delivered from an external system and convert it into a numerical value for the cardinality of the set of temporal phases to be conducted by the computational circuit and to write that numerical value into a fidelity control register. The logic could be clocked logic and could be synchronized with a timing signal used to apply operands to the registers of the computational circuit. Alternatively, the logic could be triggered based on sensing that the associated operands had been written to the registers. The means for evaluating could be hard coded logic accepting the operands, metadata, product outputs, or other values, as inputs and outputting the result of the evaluation. The means for evaluating could also be programmable logic designed to execute various kernels for more complex evaluations and output the evaluation to the means for setting.

Figure 5:
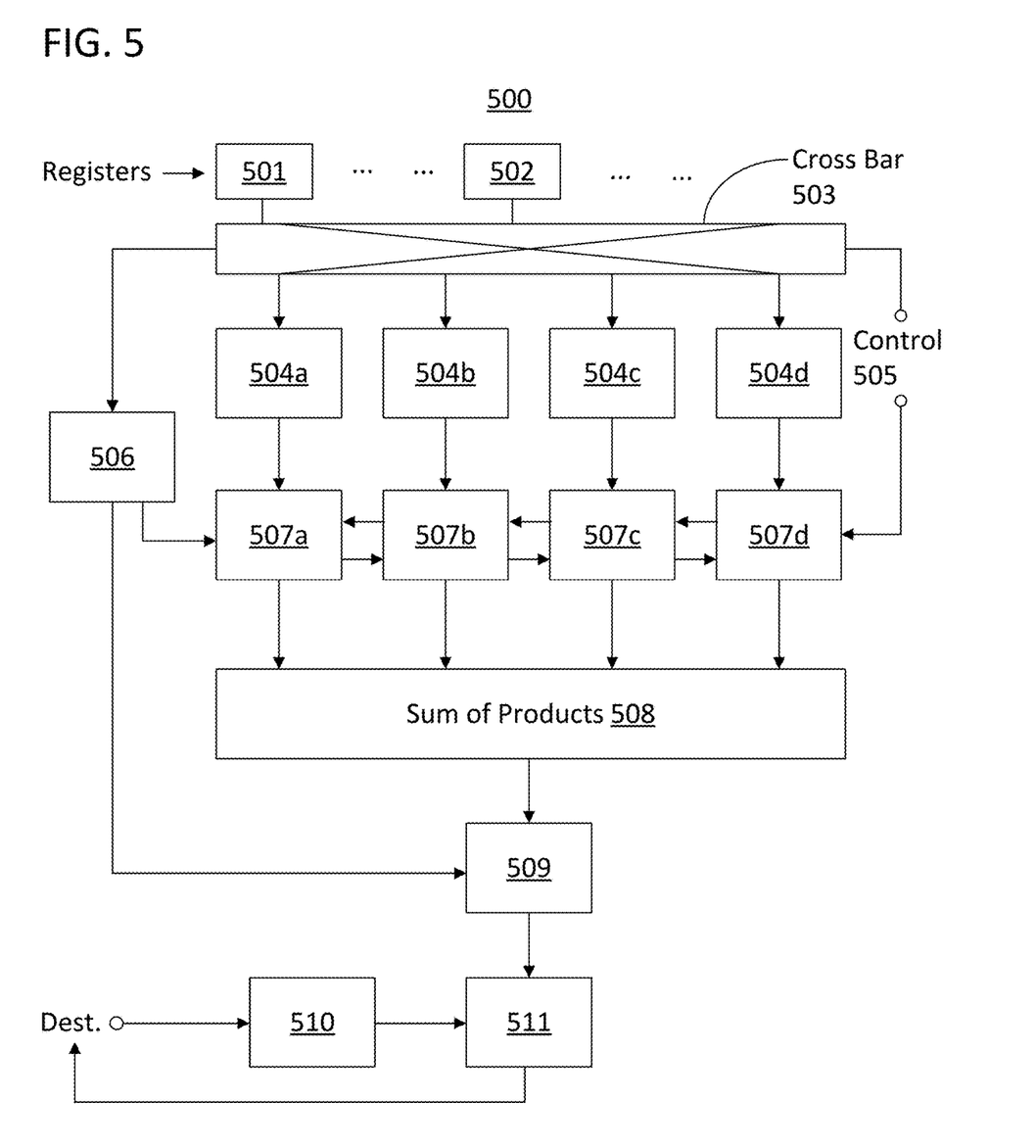
FIG. 5 illustrates a block diagram of a multiply and accumulate hardware block in accordance with specific embodiments of the inventions disclosed herein.

FIG. 5 illustrates a block diagram of a computational hardware block 500 which uses the methods described with reference to FIG. 1 in the context of a multiply and accumulate circuit. Specific benefits accrue to such implementations in the specific context of those embodiments in which the product of a temporal phase is reused through accumulation in that a multiply and accumulate circuit already requires hardware associated with accumulating the output of multiple products. As such, the same, or similar, hardware blocks can be utilized to both accumulate the product of multiple sets of multiplication computations involving different operands and to accumulate the product of multiple bit strings from different temporal phases of a computation involving those operands.

Computational hardware block 500 includes a set of registers including registers 501 and 502 in which operands can be stored. Computational hardware block 500 also includes a cross bar 503 which can select specific bit strings from the registers for delivery to the multiplier units of the computational hardware block. In the illustrated case, the multiplier units include multiplier unit 504a, multiplier unit 504b, multiplier unit 504c, and multiplier unit 504d. As such, the computational hardware block 500 can, under the influence of control input 505, provide four pairs of bit strings to the multiplier units at a time. This allows the computational hardware block to administrate temporal phases for the multiplication of four different operand pairs simultaneously. For this example, bit strings from register 501 and bit strings from register 502 will be provided through cross bar 503 to multiplier unit 504a. Furthermore, the hardware of computational hardware blocks disclosed herein can be used in a pipelined fashion such that before a temporal phase was completed, new bit strings for a different set of operands were provided to the multiplier units.

Computational hardware block 500 can shift the multiplication products based on an exponent of the operands and a position of the bit strings within their operands. Computational hardware block 500 includes an exponent circuit 506 which can sum the exponent bit strings of operands in the registers. The exponent bit strings can be passed from the registers to the exponent circuit 506 through the cross bar 503 under the control of control input 505. In specific embodiments of the invention, the exponent circuit 506 will determine the largest exponent pair from all the operands being applied to the multiplier and generate a shift reference value for each product output with reference to that largest value. The product output with the largest exponent pair would have a shift reference value of zero and the other products would have nonzero shift reference values based on how much smaller the products were compared to the products that generated the reference value. The exponent circuit 506 can then output individual reference values for each of the multiplier blocks to a series of shift circuits. In the illustrated case, shift circuits are shift circuit 507a, shift circuit 507b, shift circuit 507c, and shift circuit 507d. These circuits can receive individual reference shift values from exponent circuit 506. The shift circuits can align the products for summation in the sum of products circuit 508. In specific embodiments, if the reference shift value exceeds a given amount, such as eight bits, the shift circuit will produce a zero output for the sum of products circuit. The shift circuits can also be designed to shift the product outputs based on the control input 505. For example, the shift circuits could associate the selection of specific bit strings from a given pattern with values to shift the products. As a result, the shift circuits will shift the outputs of the multipliers based on both the exponents of the operands and the position of the bit strings being selected from the operands.

Computational hardware block 500 can accumulate multiple products of multiple pairs of operands in excess of the number of multiplication units in the block by accumulating the outputs using sum of products circuit 508. The values can be accumulated in a register referred to as a destination register. As the position of the bit strings has been taken into account by the time the values are summed in sum of products circuit 508, the same circuitry can also accumulate multiple products of multiple pairs of bit strings taken from the same operands in the registers in different temporal phases. As long as an external controller either maintains in or supplies new operands to the registers, and the appropriate pattern and shift values are applied by control input 505, the circuitry will continue to accumulate appropriately. As illustrated, the output of the sum of products circuit 508 can be sent to a shift circuit 509 which also receives the maximum exponent output from exponent circuit 506. The resulting shift can produce the sum of products value in the appropriate exponent. The value in the destination register can then also be shifted based on this exponent value by a shift circuit 510 so that the two values are aligned for summation in adder circuit 511. After summation, the newly accumulated value can be stored back in the destination register.

Figure 6:
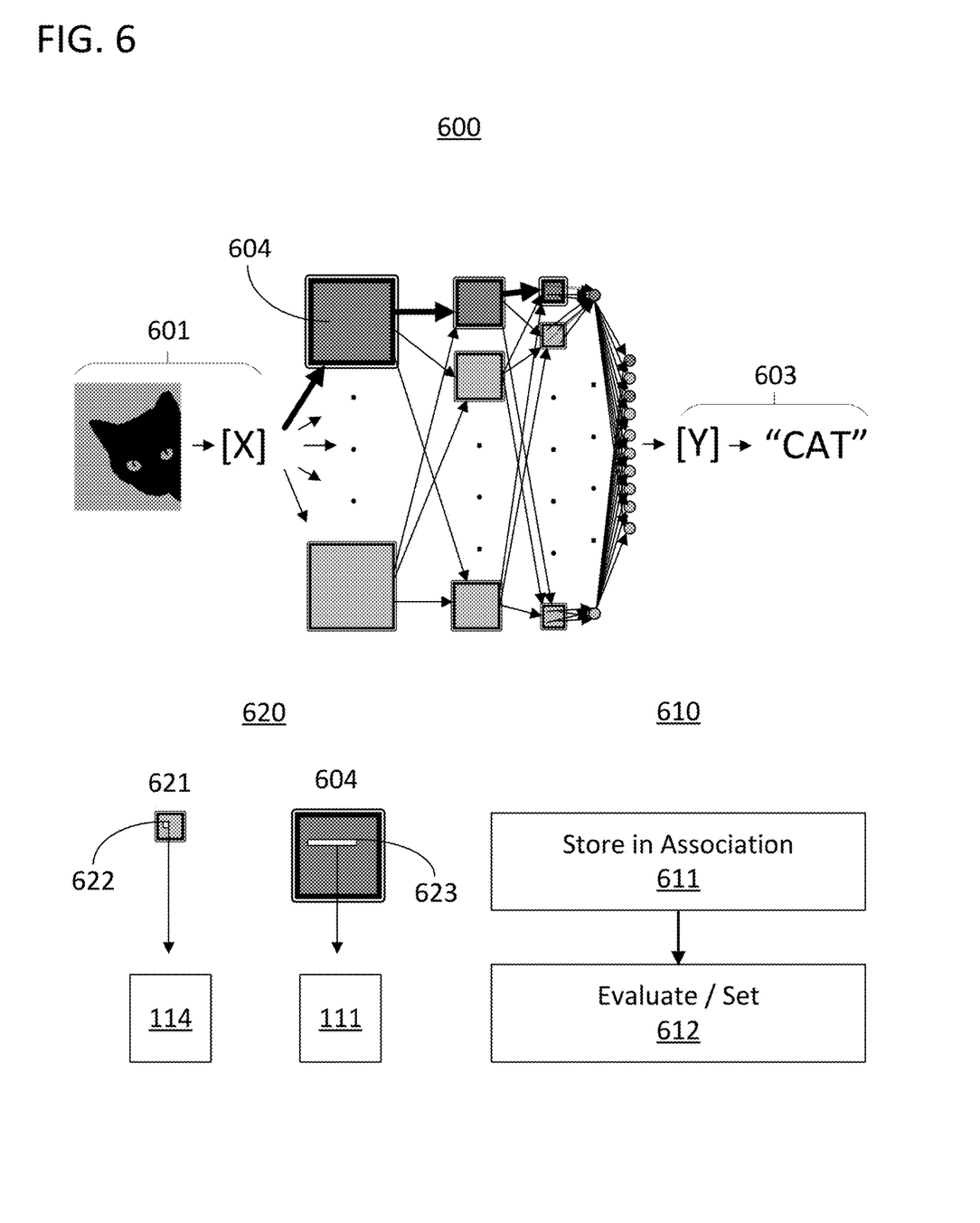
FIG. 6 illustrates the adaptive setting of a fidelity control value for a multiplication operation based on an evaluation of metadata associated with the operands for the multiplication operation in accordance with specific embodiments of the inventions disclosed herein.

FIG. 6 illustrates the adaptive setting of a fidelity control value for a multiplication operation based on an evaluation of metadata associated with the operands for the multiplication operation in accordance with specific embodiments of the inventions disclosed herein. FIG. 6 includes an illustration of an artificial neural network 600 in which an input vector [X] 601 is processed by a set of filters including filter 604 and a fully connected layer of the neural network to produce an output vector [Y] 603.

Network 600 has been tagged with metadata to emphasize certain portions of the network (bolded in the diagram) that are critical to the fidelity of the overall network in terms of providing the appropriate output [Y] in response to a given input [X]. This metadata could include fidelity control values associated with portions of the artificial neural network 600. The metadata could in turn be associated with an operand in that the operand is a part of the portion of the network. The metadata could be fixed and set based on prior executions of the network, or it could vary based on a particular input being provided to the neural network. In the illustrated case, the portion of the neural network could be filter 604 which is associated with a matrix 621 of metadata as shown in block diagram 620. The metadata could be a matrix of values associated with a set of operands in the matrix of values that is filter 604. The illustration further shows a particular value in the matrix of values of metadata in the form of fidelity control value 622 which is stored in association with filter 604 and more specifically in association with operand 623 within filter 604.

Flow chart 610 includes a step 611 of storing a fidelity control value in association with a portion of an artificial neural network. This step could involve storing the values in a matrix 621 of metadata in such a way that a computational system that pulls operands from filter 604 can discern which values in matrix 621 correspond to which operands. The step could be conducted in a way in which the matrix 621 and filter 604 were stored in association and a mapping known to the system linked values of matrix 621 to operands in filter 604. The flow chart 610 continues with a step of evaluating the metadata and setting the fidelity control value in a control register of the computational hardware block when loading the operand into the computational hardware block. The step can be conducted in place of step 402 in flow chart 400. The step can be conducted by a system that fetches both operand 623 and fidelity control value 622 based on the associated storage of the two matrices and the mapping between them. The step can involve obtaining the stored fidelity control value and loading it into a register to set the value. Alternatively, step 611 can include storing metadata in association with operand 623 and step 612 can include a mathematical analysis or operation conducted on the metadata to convert it to a fidelity control value to store in the fidelity control register.

Step 611 could instead be replaced with a step of storing a fidelity control value in association with a computation, wherein the computation uses the first operand and the second operand. In these embodiments, the fidelity control value could be stored in association with a specific instruction used to execute neural network 600 and could be loaded into a fidelity control register when an operand associated with that computation was loaded into the fidelity control register in an iteration of step 612. In this case, step 612 could involve a slightly different process of setting the fidelity control value in a control register of the computational hardware block when loading the computation for execution by at least one multiplier unit of the computational hardware block. Notably, in these embodiments, a different fidelity control value could be loaded into the fidelity control register at different times when a given operand was loaded into a computation circuit as a given operand can be utilized in many different computations throughout the course of execution of a given neural network.

In specific embodiments of the invention, the fidelity control values and association of fidelity control values with operands, product outputs, or computations can be defined programmatically. For example, the methods disclosed herein can include a step of compiling source code for a complex computation, wherein the complex computation includes a multiplication computation, wherein a fidelity control value is defined in the source code and instructions for utilizing that fidelity control value in accordance with the methods disclosed herein are generated from the source code by the compiler. The fidelity control value can be defined as a static number and associated with an operand. For example, A[1:8].fc=1 would assign a fidelity control value of 1 to an operand defined as the first eight bits of a vector A. As such, whenever that particular operand was utilized in a multiplication computation, the fidelity control value would be set to 1 and only a single temporal phase would be executed for those computations. The fidelity control value can also be defined algorithmically and associated with an operand. For example A.fc=A[n]+A[n−1]+A[n−2]+A[n−3], where "n" is the number of bits in A, would assign a variable fidelity control value equal to the number of most significant bits of the operand that are equal to 1. The source code definition could also associate specific computations with fidelity control values. For example, (A×B).fc=1 would assign a single temporal phase to all multiplication operations involved in the computation A×B. The source code definition could associate specific portions of a complex computation, such as portions of a neural network to be executed by the computational system with fidelity control values. For example, 604.fc=1 would assign a single temporal phase to all multiplication operations using any operand from filter 604 in artificial neural network 600. The source code definition could also associate specific outputs with fidelity control values. For example, if (A×B).f.1>1000; then (A×B).fc=2 would assign a fidelity control value of two to any multiplication involved in the computation of A×B if the product of the first temporal phase of such a multiplication was greater than 8.

Figure 7:
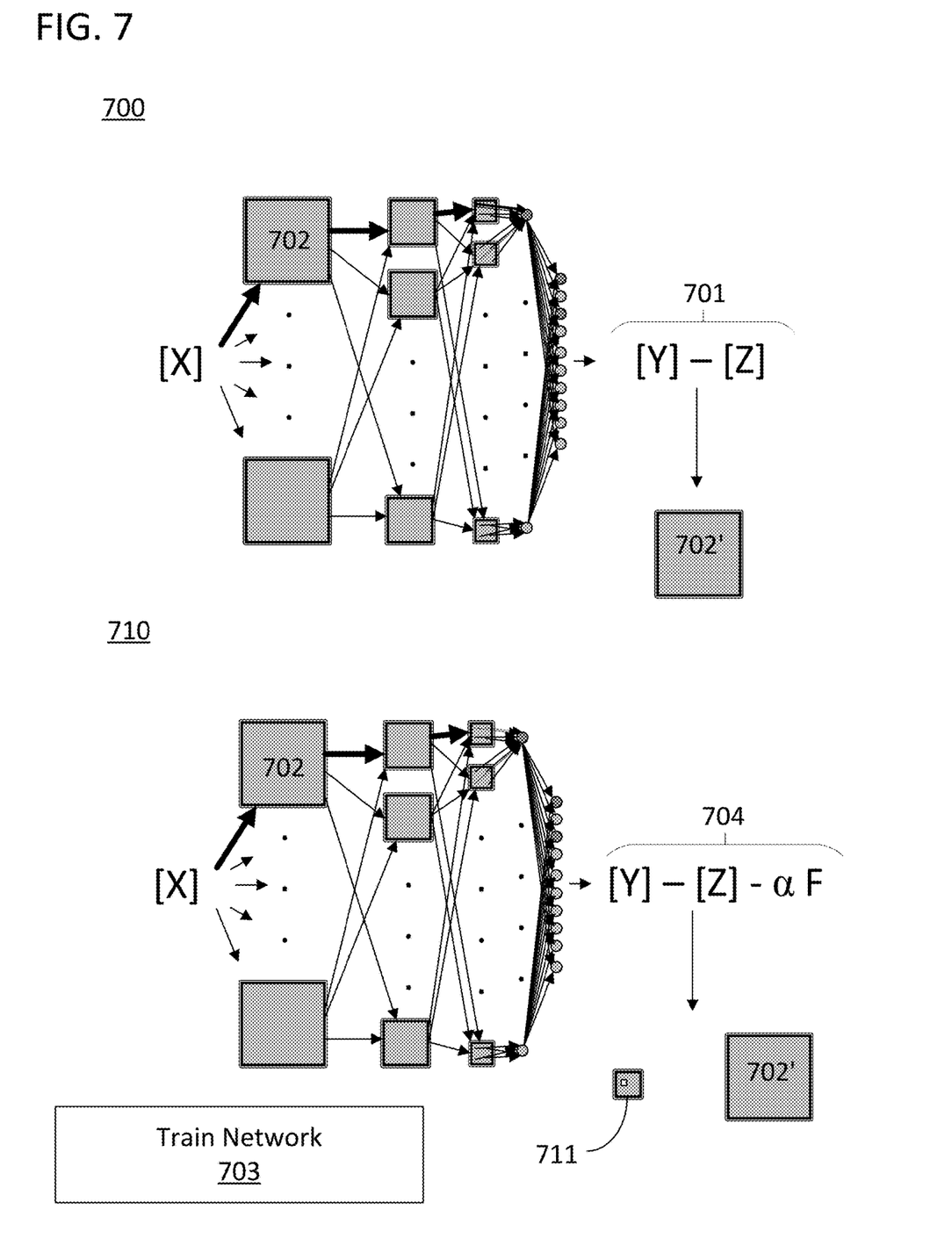
FIG. 7 illustrates a set of block diagrams for training a neural network including setting a fidelity control value associated with the neural network in accordance with specific embodiments of the inventions disclosed herein.

FIG. 7 illustrates a set of block diagrams for training a neural network including setting a fidelity control value associated with the neural network in accordance with specific embodiments of the inventions disclosed herein. Block diagram 700 illustrates a standard training iteration of a neural network in which an input [X] is fed to the network and a loss function 701 is used to update the network. In this case, the loss function is the difference between an output [Y] and an expected output [Z]. The output of this loss function is then used to update the values of the network such as the values of the operands in filter 702 to a new set of values illustrated as 702'. Specific embodiments of the inventions disclosed herein can include a step 703 of training an artificial neural network using a loss function and a training routine. As illustrated in the training routine of block diagram 710, not only are the network values such as those of filter 702 updated, but associated metadata 711, such as fidelity control values associated with those filter values, are updated as well. In these embodiments, the fidelity control values associated with the network can be adjusted in the training routine. Also, as illustrated by the value "a F" the fidelity control value can be a parameter of the loss function. As such, minimizing the number of temporal phases for the various computations is a goal that is taken into account by the training routine such that adjusting the values to balance efficiency and accuracy is built into the training process. Loss function 704 is simplified for the sake of explanation and far more complex loss functions can be utilized in accordance with specific embodiments of the inventions disclosed herein. Training in accordance with FIG. 7 can be conducted in such a way as to obtain a set of values to be used in iterations of step 402 when it is time to execute computations with operands where the fidelity control values have been associated with those operands or computations.

In specific embodiments of the invention, one or more fidelity control values could be hyperparameters of an ANN with which they were associated. For example, one or more fidelity control values could be associated with an ANN overall, parts of the ANN, a layer, filter, or weight of the ANN, or specific operands used in computations necessary to execute the ANN. The hyperparameters could be selected to optimize a training time, inference time, inference speed, or other characteristics of the associated ANN given a desired limitation on computational resource consumption. The one or more fidelity control values could be selected using a brute force analytical method or any conventional method used to search for hyperparameters for tuning the performance of an ANN as are known in the related art.

A processor in accordance with this disclosure can include at least one non-transitory computer readable media. The at least one processor could comprise at least one computational node in a network of computational nodes. The media could include cache memories on the processor. The media can also include shared memories that are not associated with a unique computational node. The media could be a shared memory, could be a shared random-access memory, and could be, for example, a double data rate (DDR) dynamic randon access memory (DRAM). The shared memory can be accessed by multiple channels. The non-transitory computer readable media can store data required for the execution of any of the methods disclosed herein, the instruction data disclosed herein, and/or the operand data disclosed herein. The computer readable media can also store instructions which, when executed by the system, cause the system to execute the methods disclosed herein. The concept of executing instructions is used herein to describe the operation of a device conducting any logic or data movement operation, even if the "instructions" are specified entirely in hardware (e.g., an AND gate executes an "and" instruction). The term is not meant to impute the ability to be programmable to a device.

A processor in accordance with this disclosure can include at least one logic circuit as described above. The logic circuit can include both active and passive devices and operate with one or more logic levels. The logic circuit can operate using Boolean logic and can be a synchronous clocked circuit or an asynchronous circuit. The logic circuit can include logic gates, flip-flops, latches, registers, and other fundamental circuit components that are required to produce a digitized logical output in response to a digitized logical input. The logic circuit can be implemented directly in hardware such that a logic or operation is conducted by a physical collection of transistors that implement an OR gate and the storage of a data element involves the physical state of at least one flip flop, delay line, or other physical storage element.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the methods disclosed herein can be executed by a processor in combination with a computer readable media storing instructions for the methods in combination with the other hardware elements described above. These and other modifications and variations to the present invention may be practiced by those skilled in the art, without departing from the scope of the present invention, which is more particularly set forth in the appended claims.

What is claimed is:

1. A method for executing a multiplication computation using a computational multiply and accumulate hardware block comprising:
storing a first operand and a second operand for the multiplication computation, wherein the first operand includes a first set of bit strings, and wherein the second operand includes a second set of bit strings;
setting a fidelity control value in a fidelity control register of the computational multiply and accumulate hardware block;
multiplying the first set of bit strings and the second set of bit strings in a set of temporal phases using the computational multiply and accumulate hardware block and evaluating the fidelity control value during the set of temporal phases, wherein each temporal phase uses a different group of bit strings from the first set of bit strings and the second set of bit strings, and wherein a cardinality of the set of temporal phases is determined by the fidelity control value;
changing the fidelity control value, during the set of temporal phases; and
accumulating, using an accumulation circuit, a set of products of the set of temporal phases and the product of multiple sets of multiplication computations involving different operands;
wherein the fidelity control value sets a fidelity of execution of the multiplication computation.

2. The method from claim 1, further comprising:
reusing a product output of the computational multiply and accumulate hardware block, from a temporal phase in the set of temporal phases, in a next temporal phase of the set of temporal phases.

3. The method from claim 1, wherein:
the first set of bit strings includes a set of most significant bits of the first operand;
the second set of bit strings includes a set of most significant bits of the second operand; and
a first temporal phase in the set of temporal phases multiplies the set of most significant bits of the first operand and the set of most significant bits of the second operand.

4. The method from claim 1, wherein:
the first operand is stored as a first floating point data structure having a first exponent bit string;
the second operand is stored as a second floating point data structure having a second exponent bit string;
the method further comprises adding the first exponent bit string and the second exponent bit string to obtain a shift reference value; and
each phase in the set of temporal phases uses the shift reference value.

5. The method from claim 1, wherein:
the cardinality of the set of temporal phases is determined by accessing a control register of the computational multiply and accumulate hardware block during the set of temporal phases.

6. The method from claim 5, wherein:
the fidelity control value is set in the control register before a first temporal phase in the set of temporal phases; and
the fidelity control value does not change during the set of temporal phases.

7. The method from claim 1, wherein:
the fidelity control value is set before a first temporal phase in the set of temporal phases; and
the fidelity control value changes during the set of temporal phases.

8. The method from claim 1, further comprising:
evaluating the first operand using an evaluation, wherein the evaluation comprises at least one of (i) a determination of a statistical value associated with at least the first operand; and (ii) a mathematical operation conducted on at least the first operand; and
setting the fidelity control value based on the evaluation.

9. The method from claim 8, further comprising:
evaluating the second operand using the evaluation;
wherein: (i) the first operand and the second operand are in a set of data structures; (ii) the evaluation determines a degree of distribution around zero of the set of data structures; and (iii) the fidelity control value is based at least in part on the evaluation of the second operand.

10. The method from claim 8, further comprising:
evaluating the second operand using the evaluation;
wherein: (i) the first operand and the second operand are in a set of floating point data structures; (ii) the evaluation determines a degree of distribution of a set of mantissas of the set of floating point data structures; and (iii) the fidelity control value is based at least in part on the evaluation of the second operand.

11. The method from claim 1, further comprising:
evaluating a product output of the computational multiply and accumulate hardware block from a temporal phase in the set of temporal phases using an evaluation, wherein the evaluation comprises at least one of (i) a comparison between an exponent of the product output and a second value; and (ii) an evaluation of metadata associated with the product output; and
setting the fidelity control value based on the evaluation.

12. The method from claim 5, further comprising:
storing the fidelity control value in association with the first operand according to an association; and
setting the fidelity control value in the control register of the computational multiply and accumulate hardware block when loading the first operand into the computational multiply and accumulate hardware block.

13. The method from claim 12, wherein the association results from:
the fidelity control value being a hyperparameter associated with a portion of an artificial neural network, wherein the portion of the artificial neural network is at least one of a layer of the artificial neural network, a filter of the artificial neural network, and a weight of the artificial neural network; and
the first operand being at least one of a weight value of the portion of the artificial neural network, and a filter value of the portion of the artificial neural network.

14. The method from claim 5, further comprising:
storing the fidelity control value in association with a computation, wherein the computation uses the first operand and the second operand; and
setting the fidelity control value in a control register of the computational multiply and accumulate hardware block when loading the computation for execution by at least one multiplier unit of the computational multiply and accumulate hardware block.

15. The method from claim 1, further comprising:
compiling source code for a complex computation, wherein the complex computation includes the multiplication computation;
wherein the fidelity control value is defined in the source code.

16. The method from claim 1, further comprising:
training an artificial neural network using a loss function and a training routine, wherein an execution of the artificial neural network includes the multiplication computation;
wherein: (i) the loss function is based at least in part on the fidelity control value; and (ii) the fidelity control value is adjusted during the training routine.

17. A computational multiply and accumulate hardware block for executing a multiplication computation comprising:
at least one non-transitory computer-readable medium storing a first operand and a second operand for the multiplication computation, wherein the first operand includes a first set of bit strings, and wherein the second operand includes a second set of bit strings;
a fidelity control register storing a fidelity control value for the computational multiply and accumulate hardware block;
at least one multiplier unit multiplying the first set of bit strings and the second set of bit strings in a set of temporal phases using the computational multiply and accumulate hardware block, wherein each temporal phase uses a different group of bit strings from the first set of bit strings and the second set of bit strings, wherein the fidelity control value is evaluated during the set of temporal phases, and wherein a cardinality of the set of temporal phases is determined by the fidelity control value;
an accumulation circuit that accumulates a set of products of the set of temporal phases and the product of multiple sets of multiplication computations involving different operands; and
a control register storing the fidelity control value.

18. A computational multiply and accumulate hardware block for executing a multiplication computation comprising:
a means for storing a first operand and a second operand for the multiplication computation, wherein the first operand includes a first set of bit strings, and wherein the second operand includes a second set of bit strings;
a means for setting a fidelity control value in a fidelity control register of the computational multiply and accumulate hardware block;
a means for multiplying the first set of bit strings and the second set of bit strings in a set of temporal phases using the computational multiply and accumulate hardware block and evaluating the fidelity control value during the set of temporal phases, wherein each temporal phase uses a different group of bit strings from the first set of bit strings and the second set of bit strings, and wherein a cardinality of the set of temporal phases is determined by the fidelity control value;
a means for changing the fidelity control value, during the set of temporal phases; and
a means for accumulating, using an accumulation circuit, a set of products of the set of temporal phases and the product of multiple sets of multiplication computations involving different operands;
wherein the fidelity control value sets a fidelity of execution of the multiplication computation.

19. The computational multiply and accumulate hardware block from claim 18, further comprising:
a means for reusing a product output of the computational multiply and accumulate hardware block, from a temporal phase in the set of temporal phases, in a next temporal phase of the set of temporal phases.

20. The computational multiply and accumulate hardware block from claim 18, further comprising:
- a means for evaluating the first operand using an evaluation, wherein the evaluation comprises at least one of (i) a determination of a statistical value associated with at least the first operand; and (ii) a mathematical operation conducted on at least the first operand; and
- a means for setting the fidelity control value based on the evaluation.

21. The computational multiply and accumulate hardware block from claim 20, further comprising:
- a means for evaluating the second operand using the evaluation;
- wherein: (i) the first operand and the second operand are in a set of data structures; (ii) the evaluation determines a degree of distribution around zero of the set of data structures; and (iii) the fidelity control value is based at least in part on the evaluation of the second operand.

22. The computational multiply and accumulate hardware block from claim 20, further comprising:
- a means for evaluating the second operand using the evaluation;
- wherein: (i) the first operand and the second operand are in a set of floating point data structures; (ii) the evaluation determines a degree of distribution of a set of mantissas of the set of floating point data structures; and (iii) the fidelity control value is based at least in part on the evaluation of the second operand.

23. The computational multiply and accumulate hardware block from claim 18, further comprising:
- a means for evaluating a product output of the computational multiply and accumulate hardware block from a temporal phase in the set of temporal phases using an evaluation, wherein the evaluation comprises at least one of (i) a comparison between an exponent of the product output and a second value; and (ii) an evaluation of metadata associated with the product output; and
- a means for setting the fidelity control value based on the evaluation.

24. The computational multiply and accumulate hardware block from claim 18, further comprising:
- a control register of the computational multiply and accumulate hardware block, wherein the cardinality of the set of temporal phases is determined by accessing the control register of the computational multiply and accumulate hardware block during the set of temporal phases;
- a means for storing the fidelity control value in association with the first operand according to an association; and
- a means for setting the fidelity control value in the control register of the computational multiply and accumulate hardware block when loading the first operand into the computational multiply and accumulate hardware block.

25. The computational multiply and accumulate hardware block from claim 18, further comprising:
- a control register of the computational multiply and accumulate hardware block, wherein the cardinality of the fidelity control value is determined by accessing the control register of the computational multiply and accumulate hardware block during the set of temporal phases;
- a means for storing the fidelity control value in association with a computation, wherein the computation uses the first operand and the second operand; and
- a means for setting the fidelity control value in a control register of the computational multiply and accumulate hardware block when loading the computation for execution by at least one multiplier unit of the computational multiply and accumulate hardware block.

* * * * *